(12) United States Patent
Vollmerhausen

(10) Patent No.: US 10,726,531 B2
(45) Date of Patent: Jul. 28, 2020

(54) RESOLUTION ENHANCEMENT OF COLOR IMAGES

(71) Applicant: Richard H. Vollmerhausen, Lake Mary, FL (US)

(72) Inventor: Richard H. Vollmerhausen, Lake Mary, FL (US)

(*) Notice: Subject to any disclaimer, the term of this patent is extended or adjusted under 35 U.S.C. 154(b) by 0 days.

(21) Appl. No.: 16/558,745

(22) Filed: Sep. 3, 2019

(65) Prior Publication Data

US 2020/0074592 A1 Mar. 5, 2020

Related U.S. Application Data

(60) Provisional application No. 62/726,453, filed on Sep. 4, 2018.

(51) Int. Cl.
| | |
|---|---|
| *G06T 5/50* | (2006.01) |
| *G06T 3/40* | (2006.01) |
| *G06T 7/90* | (2017.01) |
| *G06T 5/00* | (2006.01) |
| *G06T 5/20* | (2006.01) |
| *G09G 5/04* | (2006.01) |
| *G09G 5/10* | (2006.01) |

(52) U.S. Cl.
CPC ............... *G06T 5/50* (2013.01); *G06T 3/4015* (2013.01); *G06T 5/009* (2013.01); *G06T 5/20* (2013.01); *G06T 7/90* (2017.01); *G09G 5/04* (2013.01); *G09G 5/10* (2013.01); *G06T 2207/10024* (2013.01); *G06T 2207/10036* (2013.01); *G06T 2207/10048* (2013.01); *G06T 2207/20221* (2013.01)

(58) Field of Classification Search
CPC ............ G06T 3/4015; G06T 5/50; G06T 2207/10024; G06T 2207/10036; G06T 2207/10048; G06T 2207/20221; G06T 7/90; G06T 7/0012

See application file for complete search history.

(56) References Cited

U.S. PATENT DOCUMENTS

| | | | |
|---|---|---|---|
| 2007/0176859 A1* | 8/2007 | Cok ............... | G09G 3/3225 345/76 |
| 2012/0269430 A1* | 10/2012 | Deskevich ............. | G06T 5/003 382/167 |
| 2013/0250123 A1* | 9/2013 | Zhang ............... | G06T 7/33 348/164 |
| 2014/0205192 A1* | 7/2014 | Wang ............... | G06T 5/00 382/167 |

(Continued)

*Primary Examiner* — Xilin Guo
(74) *Attorney, Agent, or Firm* — Beusse, Wolter, Sanks & Maire PLLC; John L. DeAngelis

(57) ABSTRACT

A system for creating and displaying a color image having a higher resolution than a source color image. The system comprising a first sensor for sensing electromagnetic energy in a first spectral band to generate an achromatic image of achromatic image pixels. A second sensor for sensing electromagnetic energy in a second spectral band to generate a color image comprising a triad of color pixels. A digital processor interpolates the color triad pixels to achieve a count of color triad pixels equal to a count of achromatic image pixels. The digital processor fuses each color triad pixel, pixel by pixel, with an achromatic image pixel to produce fused color pixels. A display responsive to the fused color pixels displays a color image of the scene.

20 Claims, 3 Drawing Sheets

(56) References Cited

U.S. PATENT DOCUMENTS

| | | | | |
|---|---|---|---|---|
| 2014/0267351 A1* | 9/2014 | Klaus | ............... | G09G 5/02 |
| | | | | 345/589 |
| 2015/0288950 A1* | 10/2015 | Zhang | ............... | H04N 5/33 |
| | | | | 348/47 |
| 2019/0026876 A1* | 1/2019 | Coleman | ............ | G06K 9/4652 |
| 2019/0318451 A1* | 10/2019 | Swami | ............... | G06T 5/50 |

* cited by examiner

RESOLUTION ENHANCEMENT OF COLOR IMAGES

CROSS REFERENCE TO RELATED APPLICATION

The present application claims priority, under 35 U.S.C. 119(e), to the provisional patent application filed on Sep. 4, 2018, assigned application No. 62/726,453, and entitled Resolution Enhancement of Color Images, which is incorporated herein.

FIELD OF THE INVENTION

This disclosure relates to imaging, and more particularly to systems and methods for improving color imagery, especially color imagery taken at a long range through the atmosphere.

OBJECT OF THE INVENTION

Documentary movie, military, and security applications need color imagery captured at long range through the atmosphere. The invention disclosed herein describes the hardware implementation and image processing algorithms that recover color imagery that has degraded by long atmospheric paths.

BACKGROUND DESCRIPTION OF THE PRIOR ART

None of the prior art taken individually or collectively discloses and teaches a method for color imaging at long range with the color quality as provided by the current invention.

Panchromatic sharpening is a well-known technique that involves devoting more spatial resolution to the luminance channel of a television than the chrominance channel. Analog color television systems devote less frequency capacity or spectrum to color (chrominance) information than luminance information.

Modern versions of panchromatic sharpening use complementary metal oxide semiconductor (CMOS) imagers that use a few photo detectors to sense color and many photo detectors to sense luminance (an achromatic signal), so the color signal has much less resolution than the luminance signal.

All of the prior art, however, differs from the invention described in this disclosure in that visible light is used for both luminance and color. Also, the digital algorithms used to recover high resolution imagery for this invention is different from prior art processing.

SUMMARY OF THE INVENTION

The invention described in this disclosure incorporates the same image fusion algorithm as described in two commonly-owned and co-pending patent applications filed on even date herewith: (1) entitled Color Night Vision Goggle, assigned application Ser. No. 16/558,419 and (2) entitled Fusion of Thermal and Reflective Imagery, assigned application Ser. No. 16/559,622.

The invention described herein uses light with wavelengths longer than visible such as near infrared (NIR, typically wavelengths between 0.6 and 1.0 microns) and shortwave infrared (SWIR, typically wavelengths between 1 and 2 microns) to provide an achromatic (black and white) image. A color camera also images the same scene as an NIR or SWIR camera. That is, the SWIR/NIR camera and color camera are boresighted and have the same or approximately the same field of view. The invention described in this disclosure combines the SWIR/NIR camera image and the color camera images to improve color imaging that may have been degraded as the color spectral frequencies pass through the atmosphere.

NIR and SWIR wavelengths pass through the atmosphere with less scattering than visible light. (Note that in this document, any or all of the color blue, green, and red visible light spectrums are sometimes referred to as visible light or the visible light spectrum.)

The reduced scattering of NIR and SWIR compared to visible light is significant for multiple reasons. One reason is that more SWIR and NIR light, as compared with colored light, reaches the camera from each point in the scene. An additional factor is that all light scattered by the atmosphere is mainly forward scattered; it reaches the camera, but in the wrong area of the field of view because of the scattering effect. The scattered light reduces scene contrast, and the increased scattering of visible light means that color is degraded more than NIR or SWIR images.

Another reason the NIR and SWIR frequencies provide good imagery at longer ranges than visible light is that the path radiance from the sun or another illumination source is less for NIR and SWIR. That is, less SWIR and NIR light, compared with visible light, is scattered directly from the sun into the camera line-of-sight.

The notation SWIR/NIR camera as used herein indicates either a SWIR or a NIR camera, but not both cameras and not a camera that senses both SWIR and NIR spectrums. The color camera for use in one embodiment of the invention may have many pixels and therefore can be considered a high-resolution camera. But for the purposes of this invention, the number of pixels in the color camera is not critical. If the camera produces few but large pixels, then the pixel-level signal-to-noise ratio will be higher than if the camera generates many small pixels. If the camera has many small pixels, then a convolution process averages (sums or bins) pixels to improve the signal-to-noise ratio. A good signal to nose ratio in the color imagery is important to support contrast enhancement. That is, a clean color map is needed to fuse with the achromatic image, as further described herein.

Note the distinction between a high-resolution color camera and a high-resolution color image. Because of atmospheric degradation, the high-resolution color camera will most likely not produce a high-resolution color image at long range. Whether the camera is high resolution (that is, has many pixels) or not, the present invention makes the color detail in a distant scene visible to the observer by fusing the color data with the achromatic image data.

A typical color image for displaying on a computer monitor or television screen comprises three sub-images, one blue, one green, and one red sub-image. If the color image comprises N by M pixels, then each color slice (that is, each color slice representing one sub-image) also has N by M pixels. Thus, a color image comprises three color slices, one slice is blue, one slice is green, and one slice is red. Each color slice is an image of the scene, the blue color slice taken through a blue spectral filter (attenuating or filtering green and red spectral content), the green color slice taken through a green spectral filter, and the red color slice taken through a red spectral filter.

Typically, the three color slices generated by the camera are viewed on a monitor or television screen, although there are several other electronic or display interfaces that require additional signal formatting. Typically, these interfaces and the processing required by each one do not alter the number of pixels or the pixel intensity values within each color slice.

There are four separate color images described in this document: the blue, green, and red color camera output slices are identified as Blue_CAM, Green_CAM, and Red_CAM where CAM refers to images from the camera. The fourth color image is a collective color image of the blue, green, and red images and designated by Color_CAM. The color images output directly from the camera have a low contrast and are noisy for the reasons previously discussed.

The camera electronic output is assumed to be digital or can be digitized before processing according to the present invention. The camera digital color slices are convolved with a blur kernel to improve the signal-to-noise ratio. Each color slice is convolved with the same kernel or a kernel tailored for each particular color can be used.

The color contrast of each color slice, Blue_CAM, Green_CAM, and Red_CAM is then contrast-enhanced by subtracting the minimum pixel intensity of each color slice from all the pixels in that color slice.

All of the pixel intensities of all color slices are then divided by the maximum image intensity (the maximum intensity of all pixels in all color slices). That is, the color image intensities are normalized to real value of 1.0. Pixel intensity values will be adjusted later to accommodate the display format.

After processing the CAM color slices to improve the signal-to-noise ratio, improve the color contrast, and normalize the pixel intensity values to 1.0, the color slices are referred to as Blue_LR, Green_LR, and Red_LR, where the LR stands for low resolution.

The color slices are then interpolated to the same pixel count as the SWIR/IR images. The interpolation forms the final color slices: Blue_PIX, Green_PIX, and Red_PIX.

The color slices of the restored color image are found by multiplying (or fusing) the intensity value of each SWIR/NIR image pixel by the intensity of each corresponding pixel within each of the Blue_PIX, Green_PIX and Red_PIX color slices (collectively referred to as the Color_PIX slice). The multiplication product forms the output (final) high resolution color slices labeled Blue_HR, Green_HR, and Red_HR. That is, Blue_HR is generated by multiplying the SWIR/NIR image pixel intensities by the corresponding intensity of each pixel in the Blue_PIX color slice. The multiplication is performed pixel-by-pixel. If (I, J) indicates the $I^{th}$ pixel in the $J^{th}$ row of each image, then the intensity at Blue_HR(I, J) equals SWIR/NIR(I, J) multiplied by Blue_PIX(I, J). The Green_HR color slice is formed by multiplying (fusing) pixel-by-pixel SWIR/NIR intensities by Green_PIX intensities. The Red_HR color slice is formed by multiplying pixel-by-pixel SWIR/NIR intensities by Red_PIX intensities.

Following the pixel-by-pixel multiplication to create the color slices that form the HR color image, the Color_HR pixel intensities are raised to the 0.5 power or another exponent as needed to form a color image with an acceptable display dynamic range. The exponent affects many of the same features as a display gamma and display color maps.

Note that the invention can use any type of color camera, whether the camera uses a form of Bayer color mosaic or multiple photo detector arrays. As described, the invention operates on the color slices of the color camera output.

An additional processing detail is that the SWIR/NIR image and the (Blue_LR, Green_LR, Red_LR) color image must be boresighted; that is, they must be looking at the same field of view. Sub-pixel or even pixel alignment of the SWIR/NIR to color camera is not critical, because the color camera image is low resolution compared to the NIR or SWIR image.

Figure 1:
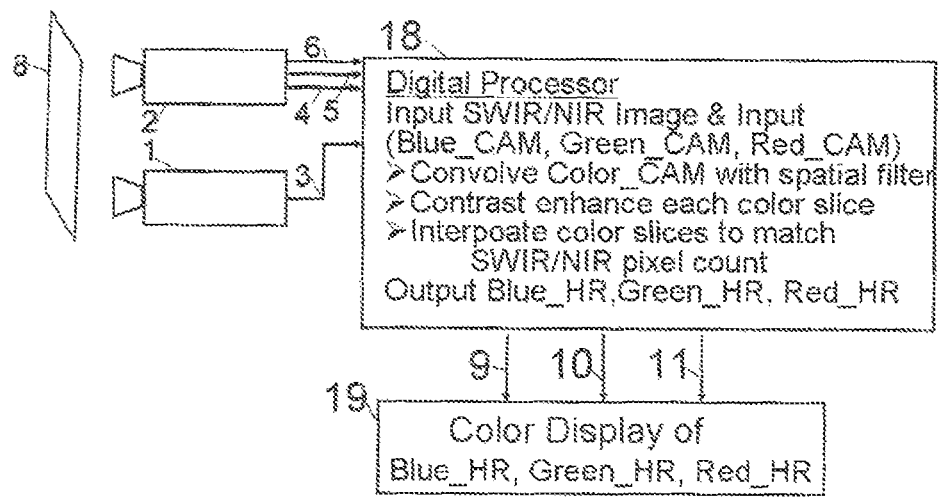
FIG. 1 illustrates a block diagram of the invention showing the relationship of the various elements.

The drawings described herein are for illustrative purposes only; the drawings are of selected embodiments, and not all possible apparatus configurations are shown. The drawings are not intended to limit the scope of the present disclosure.

For clarity and in order to emphasize certain features, all of the invention features are not shown in the drawings, and all of the features that might be included in the drawings are not necessary for every specific embodiment of the invention. The invention also encompasses embodiments that combine features illustrated in the drawings; embodiments that omit, modify, or replace, some of the features depicted; and embodiments that include features not illustrated in the drawings.

DETAILED DESCRIPTION OF THE PREFERRED EMBODIMENTS

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
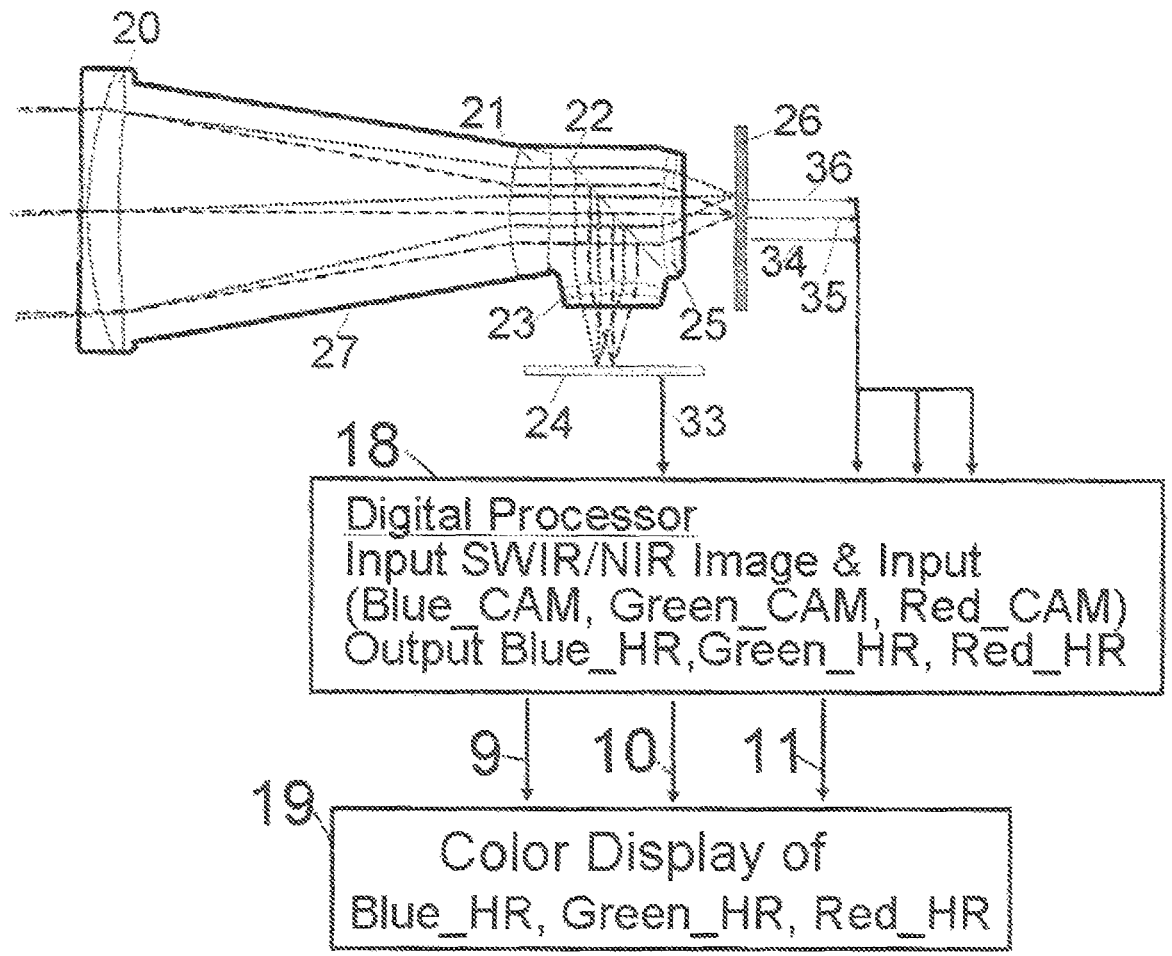
FIG. 2 illustrates use of a single lens to implement a combination SWIR/NIR and color camera so that the benefits of color enhancement can be achieved conveniently, without the use of multiple cameras and separate processing hardware.
Figure 3:
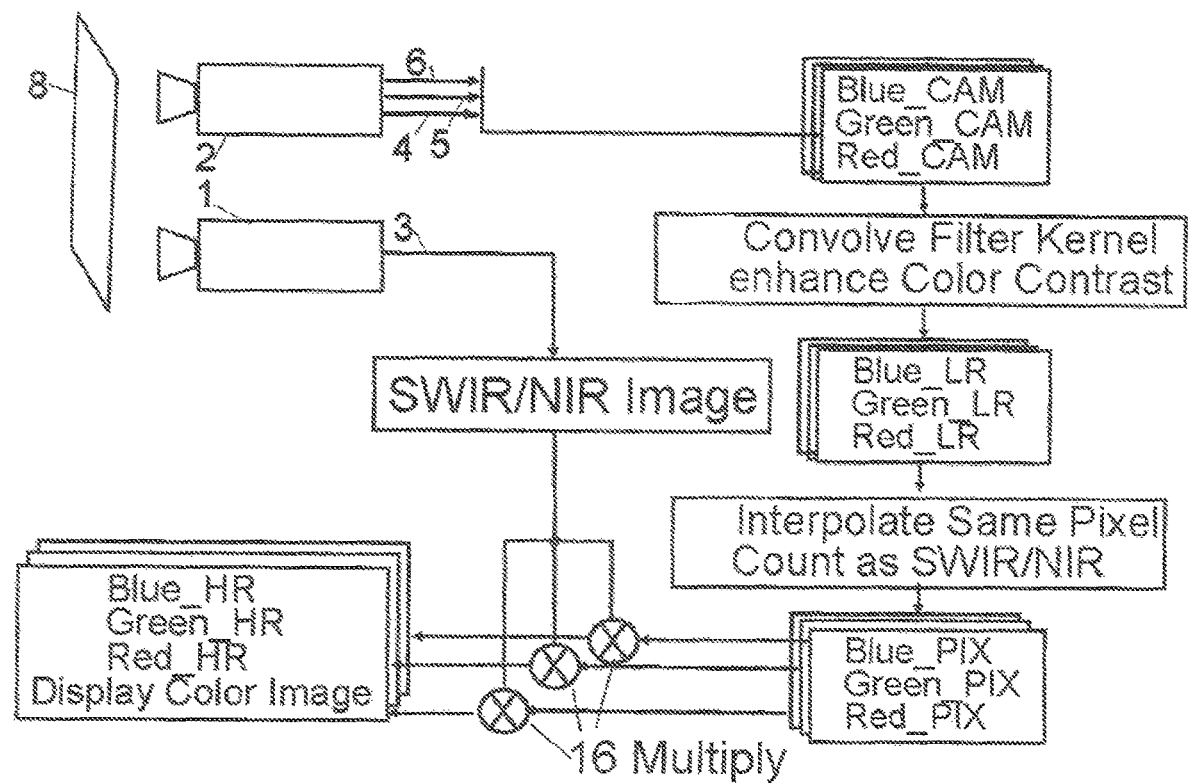
FIG. 3 illustrates the digital signal processing steps to restore color detail when images are taken at long range through the atmosphere.

FIGS. 1 through 3 illustrate implementations of color imaging at long range through the atmosphere. Implementation involves applying the digital processing illustrated in FIG. 3 to the outputs of two separate cameras that are illustrated in FIG. 1. For example, the color digital processing can be applied to imagers that are currently part of a sensor suite that is already fielded or ready for fielding. Implementation may involve fabricating a camera with both color and SWIR/NIR focal planes as shown in FIG. 2, and then applying the digital processing of FIG. 3 to the color and SWIR/NIR outputs of the two-array camera.

FIG. 1 shows two cameras both imaging a scene 8. Reference character 1 denotes either a shortwave infrared (SWIR) camera and lens or a near infrared (NIR) camera and lens. Reference character 3 denotes the image output of the SWIR/NIR imager. Reference numeral 2 denotes a color camera that outputs blue, green, and red color slices (in digital form), denoted respectively by reference numerals 4, 5, and 6.

The cameras are boresighted and have the same or approximately the same view of the scene 8.

In FIG. 1, reference numeral 18 denotes a digital processor and reference numeral 19 denotes a color display. The box labeled "Digital Processor" 18 in FIG. 1 sets forth the functions performed by the digital processor 18, as further described below.

The digital processor 18 spatially filters the color camera output to improve the signal-to-noise ratio. Digital processing also enhances color contrast by removing the color pedestals of all the color slices.

Digital processing normalizes each color slice to the maximum image pixel intensity, but alternatively, restores color balance if information is available about the relative color transmission of the atmosphere. The digital processor 18 also interpolates the pixel count of the three Color_LR slices, if required, to match the pixel count of the SWIR/NIR images.

The digital processor 18 also normalizes all the SWIR/NIR pixel intensities to a maximum value of 1.0.

The digital processor 18 in FIG. 1 also works in association with camera lens selection and mechanical mounting to align the color camera 2 and SWIR/NIR camera 1 to view the same scene detail with an equivalent area of the two fields of view.

Output electrical signals from the digital processor 18 are correctly formatted to drive a color display 19. The color slices Blue_HR, Green_HR, and Red_HR are represented in FIG. 1 by reference numerals 9, 10, and 11, respectively.

FIG. 2 illustrates one configuration of a camera that images two independent spectral bands. In some cases, imaging both SWIR/NIR and color in the same camera is more convenient in terms of the system size and weight, partly because only one lens and enclosure is needed, but also because the digital processor can be located in the same enclosure. The digital processing associated with the present invention is not computationally intensive and therefore does not generate an excess amount of heat.

In FIG. 2, the digital processor 18, the color signals 9, 10, and, 11, and the color display 19 are the same as described in FIG. 1. In particular, the box representing the digital processor 18 identifies functions performed by the digital processor 18.

In FIG. 2, reference numerals 20 and 21 denote lenses that form afocal optics imaging for both the color and SWIR/NIR spectral bands at infinity. A beam splitter 22 separates the two spectral bands. An SWIR/NIR imager optic 23 forms an image on the SWIR/NIR focal plane array 24. A color imager optic 25 forms an image on a color focal plane array 26. The color focal plane array 26 uses a Bayer or Bayer-like spectral mosaic to output color imagery signals. Reference character 33 denotes the SWIR/NIR output video signal and reference characters 34, 35, and 36 denote the color slice video outputs. An enclosure 27 encloses the illustrated optical components.

FIG. 3 diagrams the digital processing operations in more detail than in FIGS. 1 and 2.

The SWIR/NIR camera 1 and the color camera 2 view the scene 8. The SWIR/NIR video output 3 is processed as known in the industry to provide a good image for display. That is, gain, level, exposure time, contrast enhancement, and other adjustments as used in modern cameras are applied and are not described herein.

The color camera color output slices 4, 5, and 6, like the SWIR/NIR imagery, are processed to provide a good display image. However, if sufficient control of the camera is available, the various color slices can be optimized separately by using different exposure times for blue, green, and red imaging. Typically, such a functional control is not available on conventional color cameras, however.

Convolution of a spatial filter over the Blue_CAM, Green_CAM, and Red_CAM color slices improves the signal-to-noise ratio.

Contrast enhancement of each color slice first subtracts the minimum value of that color slice and then normalizes the pixel values in all color slices to the maximum image value. The image values are normalized to a real value of 1.0. However, in a later step, display of the color image may require altering the pixel intensity amplitudes to be consistent with the chosen video or picture/display format.

The convolution and contrast enhancement processes convert the Blue_CAM, Green_CAM, and Red_CAM signals (referred to collectively as the Color_LR signal) to respective Blue_LR, Green_LR, and Red_LR signals (referred to collectively as the Color_LR signal) as shown in FIG. 3.

The Color_LR signals are converted to Color_PIX signals by interpolating the Color_LR signals to achieve the same pixel count as the SWIR/NIR camera pixel count. These three digital processes, convert the Blue_CAM, Green_CAM, and Red_CAM color slices to Color_PIX (Blue_PIX, Green_PIX, and Red_PIX) to prepare for pixel-by-pixel multiplication of the two image types.

Digital processing as well as mechanical alignment of sensors and the selection of lenses for the two cameras 1 and 2 align the SWIR/NIR image pixels with the Color_PIX image pixels. Alignment is necessary over the entire field of view, not just alignment of camera lines of sight. The alignment methods vary, and the needed alignment precision depends on the resolution of the two cameras as well as the spatial filtering.

Pixel-to-pixel alignment of the SWIR/NIR image and Color_PIX image is not critical provided the spatial filter is sufficiently large. Various mechanical, optical, and digital alignment methods are known in the imager engineering community, and thus specific methods are not described here.

The SWIR/NIR pixel intensities are normalized to a real 1.0. It is expected that non-uniformity correction as well as gain, level, and contrast enhancement has been applied to the SWIR/NIR image as part of the normal camera imaging process.

Returning to FIG. 3, the SWIR/NIR and Color_PIX images are multiplied by multipliers 16 to generate the Color_HR display image. As shown, each Color_PIX slice (Blue_PIX, Green_PIX, and Red_PIX) is multiplied pixel by pixel with the SWIR/NIR image. That is, the pixel intensities of the SWIR/NIR image are multiplied by the aligned pixel intensities of the components (Blue_PIX, Green_PIX, and Red_PIX) of the Color_PIX image. The result of the multiplication of the three color slices with the SWIR/NIR image is the output color image Color_HR (with components Blue_HR, Green_HR, and Red_HR).

The Color_HP pixels are digitally formatted to comply with the display standard chosen.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A system for displaying a color image of a scene with higher resolution color detail, the system comprising:
    a first camera for sensing light in a spectral band of wavelengths longer than visible light, thereby generating an achromatic image comprising a plurality of achromatic image pixels;
    a second camera for sensing light in a visible light spectral band thereby generating a color image comprising color triad pixels as a triad of color slices, the color triad pixels sized to effectively collect light;
    the digital processor for interpolating the color triad pixels to achieve a count of color triad pixels equal to a count of achromatic image pixels;
    the digital processor for multiplying an intensity value of each color triad pixel of the color image, pixel by pixel, with an intensity value of each achromatic image pixel, thereby producing multiplied color pixels; and
    a display responsive to the multiplied color pixels for displaying a color image of the scene.

2. The system of claim 1, wherein the triad of color slices comprises a blue color slice, a green color slice, and a red color slice.

3. The system of claim 1 wherein the achromatic image has a first resolution and the color image has a second resolution, the first resolution greater than the second resolution.

4. The system of claim 1, wherein the spectral band of wavelengths longer than visible light comprises a near infrared spectral band (NIR) or a short wave infrared spectral band (SWIR), and the first camera for sensing light in a spectral band of wavelengths longer than visible light comprises a corresponding near infrared camera or a shortwave infrared camera.

5. The system of claim 1, further comprising the digital processor processing the triad of color slices to improve a signal-to-noise ratio of each color slice, to enhance color contrast of each color slice, or to normalize color triad pixel intensity values of each color slice.

6. The system of claim 5, wherein processing to improve the signal-to-noise ratio comprises using a kernel convolution process to average pixels.

7. The system of claim 5, wherein processing to enhance color contrast comprises determining a minimum pixel intensity in each color slice and subtracting the minimum pixel intensity from each pixel intensity in the each color slice.

8. The system of claim 5, wherein processing to normalize the color triad pixel intensity values comprises determining a maximum color triad pixel intensity value in all color slices and dividing the color triad pixel intensity values in each color slice by the maximum pixel intensity value.

9. The system of claim 5, wherein processing to normalize the color triad pixel intensity values comprises determining a relative atmospheric value for each color slice and normalizing the color triad pixels in each color slice responsive to the relative atmospheric value for the each color slice.

10. The system of claim 1, the display for correcting pixel intensity values for display gamma.

11. The system of claim 1, for gamma correction, the display for taking a square root of each pixel intensity after fusing.

12. The system of claim 1, wherein the first camera and the second camera comprise a multi-spectral camera for sensing light in the spectral band of wavelengths longer than visible light and for sensing light in the visible light spectral band.

13. The system of claim 1, the digital processor for aligning scene details in the achromatic image with same scene details in the color image.

14. The system of claim 1 wherein the second camera comprises a color camera.

15. A system for displaying a color image of a scene, the system comprising:
    a near infrared spectral band (NIR) sensor or a short wave infrared spectral band (SWIR) sensor for generating an achromatic image comprising achromatic image pixels;
    a color image sensor for generating a color image comprising pixels of a triad of color slices, comprising a blue color slice, a green color slice, and a red color slice;
    the achromatic image having a first resolution and the color image having a second resolution, the first resolution greater than the second resolution;
    a digital processor for processing the triad of color slices to improve a signal-to-noise ratio of each color slice, to enhance color contrast of each color slice, or to normalize pixel intensity values of each color slice;
    the digital processor for interpolating the pixels of the triad of color slices to achieve a count of the pixels of the triad of color slices equal to a count of the achromatic image pixels;
    the digital processor for multiplying an intensity value of each pixel of the triad of color slices, pixel by pixel, with an intensity value of each achromatic image pixel, thereby producing multiplied color pixels; and a display responsive to the multiplied fused color pixels for displaying a color image of the scene.

16. The system of claim 15, wherein processing to improve the signal-to-noise ratio comprises using a kernel convolution process to average pixels.

17. The system of claim 15, wherein processing to enhance color contrast comprises determining a minimum pixel intensity among the color triad pixels in each color slice and subtracting the minimum pixel intensity from each pixel intensity in the each color slice.

18. The system of claim 15, wherein processing to normalize pixel intensity values comprises determining a maximum pixel intensity value among the color triad pixels in all color slices and dividing color triad pixel intensity values in each color slice by the maximum pixel intensity value.

19. The system of claim 15, wherein the near infrared spectral band sensor or the short wave infrared spectral band sensor and the color image sensor comprise a single multi-spectral camera.

20. A method for displaying a color image of a scene with improved color detail, the system comprising:

sensing light in a spectral band of wavelengths longer than visible light and responsive thereto generating an achromatic image comprising achromatic image pixels;

sensing light in a visible light spectral band and responsive thereto generating a color image comprising color triad pixels as a triad of color slices;

a digital processor for interpolating the color triad pixels to achieve a count of color triad pixels equal to a count of achromatic image pixels;

the digital processor for multiplying an intensity value of each color triad pixel, pixel by pixel, with an intensity value of each achromatic image pixel, thereby producing multiplied color pixels; and a display responsive to the fused color pixels for displaying a color image of the scene.

* * * * *